United States Patent [19]

Knauf

[11] 3,954,492

[45] May 4, 1976

[54] CALCIUM SULPHATE ANHYDRITE MORTAR

[75] Inventor: Karl Knauf, Iphofen, Germany

[73] Assignee: Gebruder Knauf West Deutsche Gipswerke, Ipohfen, Germany

[22] Filed: Sept. 13, 1974

[21] Appl. No.: 505,795

Related U.S. Application Data

[62] Division of Ser. No. 319,393, Dec. 29, 1972.

[30] Foreign Application Priority Data

Jan. 3, 1972 United Kingdom.................... 195/72

[52] U.S. Cl................................. 106/109; 423/555
[51] Int. Cl.² .................... C04B 11/00; C01F 11/46
[58] Field of Search...................... 423/555; 106/109

[56] References Cited
UNITED STATES PATENTS

| | | | |
|---|---|---|---|
| 3,650,689 | 3/1972 | Cafferata............................ | 106/109 |
| 3,872,204 | 3/1975 | Yano et al. ......................... | 106/109 |

FOREIGN PATENTS OR APPLICATIONS

| | | | |
|---|---|---|---|
| 521,997 | 6/1940 | United Kingdom................. | 106/109 |

Primary Examiner—Winston A. Douglas
Assistant Examiner—John P. Sheehan
Attorney, Agent, or Firm—Holman & Stern

[57] ABSTRACT

Particulate anhydrite, of whose particles from about 2 to 6% by weight have a particle size greater than about 5 mm, from about 13 to 23% by weight have a particle size of from about 5 to 3.15 mm, from about 33 to 40% by weight have a particle size of from about 3.15 to 1 mm, from about 17 to 23% by weight have a particle size of from about 1 to 0.2 mm, and from about 17 to 33% by weight have a particle size less than about 0.2 mm, will provide a mortar developing high early strength without requiring an excessive amount of water. If the particles having a size less than about 0.2 mm are activatingly ground to increase their energy content to above the minimum possible under ambient pressure and temperature conditions, a particularly speedy initial rise in strength takes place.

7 Claims, No Drawings

CALCIUM SULPHATE ANHYDRITE MORTAR

This is a divisional, of application Ser. No. 319,393, filed Dec. 29, 1972.

The present invention relates to a particulate anhydrite ($CaSO_4$) whose particle size is so chosen as to make it especially effective for use as a high strength mortar. Anhydrite, which is anhydrous calcium sulphate, is converted by water into gypsum ($CaSO_4$, $2H_2O$) during setting. Once the mortar mass has set, it is bound together with 3-dimensional stability by interlocked crystals of gypsum. This property makes anhydrite particularly suitable for use as a mortar in the present invention. By the use of certain accelerators of set, generally solutions of various salts especially sulphates, mortars have been produced for various purposes.

The strength of this gypsum-bound mass will vary with time as setting proceeds but, at any given time, it will depend on:

a. the degree of conversion of anhydrite to gypsum;
b. the residual moisture content;
c. its internal structure; and
d. the firmness of attachment of the binding phase (gypsum) to the intercalated phase (filler).

In order to achieve a high degree of conversion to the dihydrate (gypsum), the anhydrite is normally finely ground (e.g. the proportion of the anhydrite having a particle size greater than 0.1 mm is substantially zero; Blaine values are over 4,000 $cm^2/g$) and the most effective possible accelerators of set are added to the anhydrite.

Since the more finely ground the anhydrite, the larger the quantity of mixing water required, it would be better to keep the proportion of finely ground material to a minimum, in order to keep as low as possible both the residual water content and the internal heating when a large quantity of anhydrite mortar is used. The intercalated phase is preferably anhydrite having a specific particle size distribution. It has been shown that the adhesion between the gypsum binding phase and the intercalated phase is better when the intercalated phase consists of anhydrite rather than of other substances, due to the chemical affinity of gypsum for anhydrite.

We have surprisingly found that the opposing requirements for the quantity of mixing water, the rate of hydration, the rise in temperature following gypsum formation, the internal structure, the residual water content and the increase in strength may be met by a particulate anhydrite, of whose particles from 2 to 6% by weight have a particle size greater than 5 mm, from 13 to 23 % by weight have a particle size of from 5 to 3.15 mm, from 33 to 40 % by weight have a particle size of from 3.15 to 1 mm, from 17 to 23 % by weight have a particle size of from 1 to 0.2 mm and from 17 to 33 % by weight have a particle size less than 0.2 mm. The particles having a size less than 0.2 mm are preferably activatingly ground, since this will give an accelerated increase in strength performance.

The important fraction of the particulate anhydrite in the achievement of high early strength is that fraction having a particle size less than 0.2 mm. We have found that the initial rise in strength takes place more quickly if the fraction having a particle size less than 0.2 mm is activatingly ground in what are termed "disintegrators." After the anhydrite raw material has been crushed, the fine material is separated either completely or partially, is activatingly ground and is then added to the coarse material. Alternatively, the anhydrite raw material is first crushed so that the proportion of particles having a size less than 0.2 mm is small and then separately ground active fine anhydrite particles are added in the required amount.

The effect of the activating grinding is to increase the energy contained in the fine particles of anhydrite without increasing their temperature. If a solid body has a higher energy content than the minimum possible under the relevant pressure and temperature conditions, it is said to be in an "active state." Certain grinding processes are capable of causing the material to assume an active state: such processes are referred to herein as "activating grinding" processes and the term "activatingly ground" is to be construed accordingly.

In such activating grinding processes, the whole of the mechanical energy expended in grinding is not converted into heat; a small proportion is absorbed by the particles of solid material being ground to raise those particles to a higher energy state. This energy is generally absorbed by means of changes in the lattice structure or by the creation of lattice defects in the solid material. The process of activating grinding and the theory on which the process is based are discussed in greater detail in the articles "Mechanophysikalische und mechanochemische Reaktionen beim Schwingmahlverfahren" (Mechano-physical and mechano-chemical reactions in the oscillatory grinding method) by E. Gock and M. Korn in the Anlagen-Technik, October 1971, pages 77 to 80 and "Zur tribomechanischen Aktivierung von Festkorpern unter Anwendung hoher mechanischer Energien" (Tribomechanical activation of solid bodies when using high mechanical energies) by Johannes Hint in Silikattechnik 21 (1970) Part 4, pages 116 to 121. We particularly prefer to use the "disintegrator" described in the article "Zur tribomechanischen Aktivierung von Festkorpern unter Anwendung hoher mechanischer Energien," that is a mill in which the grinding is effected by a plurality of pins mounted on a rotor; the repeated shocks experienced by the particles as they are struck by the pins causes a substantial increase in the energy content of the particles.

We prefer that the water : anhydrite weight ratio in the mortar should be from 0.09:1 to 0.12:1; with such a ratio, this anhydrite binder provides the mortar with 24 hour compression strengths greater than 100 $kp/cm^2$, even when the mortar is used for filling large cavities, for building large scale walls or for building dams, and even under temperature and atmospheric moisture conditions which are markedly different from those of a normal climate. This anhydrite binder is thus especially suitable for use in mining operations. This following Table compares the increase in strength of two types of anhydrite mortars, one using a ground anhydrite having a conventional range of particle sizes, and the other using anhydrite according to the present invention. Each anhydrite has the same percentage space filling. The compression strengths were determined using prisms of mortar of size 4 × 4 × 6 cm, tested in a moist condition.

The particle size distribution of conventionally used anhydrite normally is as follows:

| | |
|---|---|
| >0.2 mm | 0.3% |
| 0.09 – 0.2 mm | 0.8% |

-continued

| | |
|---|---|
| 0.06 – 0.09 mm | 4.0% |
| <0.06 mm | 94.9% |

The distribution of particle sizes of the anhydrite of the present invention was as follows:

| | | |
|---|---|---|
| >5.0 mm | | 2.5 % |
| 5.00 – 3.5 mm | | 19.4 % |
| 3.15 – 1.00 mm | | 35.3 % |
| 1.00 – 0.2 mm | | 18.4 % |
| 0.2 – 0.09 mm | | 3.8 – 4.1 % |
| 0.09 – 0.063 mm | | 6.8 – 7.2 % |
| <0.063 mm | | 13.5 – 14.2 % |

One anhydrite used in the present invention was activatingly ground in a "disintegrator," whereas the other anhydrite was ground under conventional conditions. In both types of mortar, the ratio of water to anhydrite was 0.09 : 1, the water being supplied by a solution of sulphate accelerators containing 3.5 % by weight potassium sulphate and 6.5 % by weight ferrous sulphate.

TABLE

| Setting time (hours) at 20°C/95% relative humidity | Compression strengths (kp/cm²) of anhydrite mortars | | |
|---|---|---|---|
| | Conventionally used | Invention non activating grinding | activating grinding |
| 24 | 85 | 120 | 168 |
| 72 | 100 | 224 | 246 |

Mortar comprising the anhydrite of the invention may be used to form bulkheads to support the roof at or adjacent the face of a mining tunnel or shaft. These bulkheads are commonly made from waste materials or wood, but bulkheads made from either of these known materials tend to be difficult to install and will sink before they assume any pressure. The loss of height tends to be some 40 to 50 % of the average thickness. Furthermore, bulkheads of this type tend to leak, which result in losses due to weathering and in the danger of fire in abandoned workings. We have now discovered that suitable bulkheads may be manufactured from a mortar containing the anhydrite of the invention. The advantages of this are considerable. Thus, the anhydrite mortar can be supplied to the required position through pipes and may be blown right up to directly under the roof. The mortar achieves a high early strength and thus will bear the weight of the roof almost immediately. Since the conversion of anhydrite to gypsum involves a volume increase, the setting bulkhead will tend to grow towards the sinking roof.

Moreover, the bulkhead will be continuous, without any gaps or apertures and will lie completely up against the bedrock. The bulkhead is impermeable to air and other gases and thus avoids losses due to weathering and minimizes the risk of fires in abandoned workings.

Of course, it is normally necessary to add an accelerator of set to the mortar in order to induce the anhydrite to react quickly with the water. Such an accelerator may be any one of those conventionally used, but we particularly prefer to use a water-soluble sulphate. Ferrous sulphate and potassium sulphate are particularly preferred and we most prefer to use a mixture of ferrous sulphate and potassium sulphate. The sulphate accelerator is preferably used in an amount of about 1 % by weight, based on the weight of the anhydrite. If a mixture of ferrous sulphate and potassium sulphate is used, the relative amounts preferably range from a weight ratio of 2 : 8 to 5 : 5 (potassium sulphate : ferrous sulphate), most preferably about 3.5 : 6.5. Since the sulphate accelerator is generally used in the form of an aqueous solution containing about 10 % by weight of sulphate accelerator, sufficient solution to supply about 1 % of accelerator, based on the weight of anhydrite, will normally supply the water needed for the mortar.

We claim:

1. A mortar consisting essentially of particulate anhydrite and water, the weight ratio of water to anhydrite being from about 0.09 : 1 to about 0.12 : 1, wherein from about 2 to 6% by weight of the particles of particulate anhydrite have a particle size greater than about 5 mm, from about 13 to 23% by weight have a particle size of from about 5 to 3.15 mm, from about 33 to 40% by weight have a particle size of from about 3.15 to 1 mm, from about 17 to 23% by weight have a particle size of from about 1 to 0.2 mm, and from about 17 to 33% by weight have a particle size less than about 0.2 mm.

2. A mortar as claimed in claim 1, wherein the particles having a size less than 0.2 mm have an energy content greater than the minimum possible under ambient pressure and temperature conditions.

3. A mortar as claimed in claim 1, additionally including an accelerator of set selected from the group consisting of ferrous sulphate, potassium sulphate and mixtures of ferrous sulphate and potassium sulphate.

4. A mortar as claimed in claim 2, additionally including an accelerator of set selected from the group consisting of ferrous sulphate, potassium sulphate, and mixtures of ferrous sulphate and potassium sulphate.

5. A mortar as claimed in claim 1, additionally including a mixture of potassium sulphate and ferrous sulphate in which the weight ratio potassium sulphate : ferrous sulphate is from about 2 : 8 to about 5 : 5.

6. A mortar as claimed in claim 2, additionally including a mixture of potassium sulphate and ferrous sulphate in which the weight ratio potassium sulphate : ferrous sulphate is from about 2 : 8 to about 5 : 5.

7. A mortar as claimed in claim 2, additionally including a water-soluble sulphate in an amount of about 1% by weight, based on the weight of the anhydrite.

* * * * *